United States Patent Office 3,358,431
Patented Dec. 19, 1967

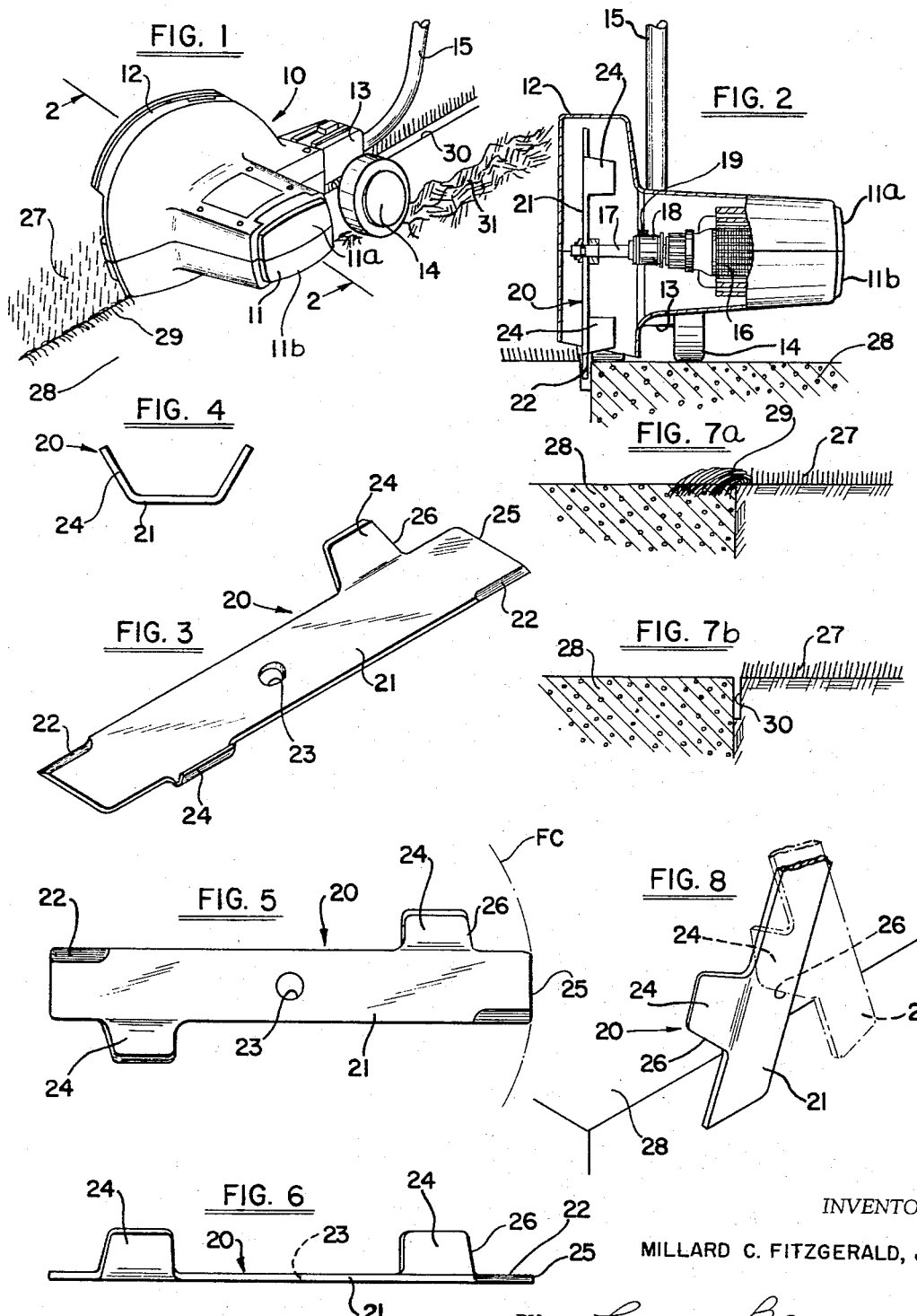

3,358,431
BLADE FOR LAWN EDGER
Millard C. Fitzgerald, Jr., Baltimore County, Md., assignor to The Black and Decker Manufacturing Company, Towson, Md., a corporation of Maryland
Filed Feb. 25, 1965, Ser. No. 435,143
1 Claim. (Cl. 56—295)

ABSTRACT OF THE DISCLOSURE

An improved blade is provided for a lawn edger. This blade comprises a relatively-thin flat bar, which is substantially rectangular in plan view, and has respective longitudinal side edges joined by respective ends. An aperture (or other means) is provided centrally of the bar, facilitating a mounting of the bar for rotation about an axis which is perpendicular to the plane of the bar, whereby each of the longitudinal side edges has a "leading" edge and "trailing" edge. A cutting edge is formed on each of the leading edges of the bar. Each cutting edge begins at the end of the bar and extends radially inwardly therefrom along the respective leading edge of the bar, whereby the cutting edges are disposed diagonally of one another and together form the annular cutting swath of the blade. A scoop is formed on each of the trailing edges of the bar. Each scoop extends radially inwardly of the annular cutting swath of the blade; and each scoop is formed integrally with the bar, projects laterally and upwardly therefrom, and forms an obtuse dihedral angle with the bar.

Object of the invention

The objects of the invention are to provide an improved lawn-edger blade which is economically formed from a single piece of metal, and which is rugged and reliable for continuous duty. This blade is useful, for example, in a portable electric lawn-edger machine. The cutting edges of the blade are adapted to cut a relatively-narrow swath in a lawn alongside of an adjacent sidewalk, while the scoops are adapted for scooping and blowing the overlying grass and dirt away from the adjacent sidewalk. As a result, the overlying grass and dirt is severed, scooped away from the sidewalk, and accelerated in a direction away from the lawn and away from the operator of the machine.

These and other objects of the present invention will become apparent from a reading of the following specification, taken in conjunction with the enclosed drawings, in which:

Description of the drawings

FIGURE 1 is a partial perspective of a wheeled power-operated lawn-edging machine;

FIGURE 2 is a longitudinal section taken along the lines 2—2 of FIGURE 1, showing the mounting of the blade of the present invention to the driving shaft of an electric motor housed in the machine;

FIGURE 3 is a perspective of the improved blade of the present invention;

FIGURE 4 is an end elevation thereof;

FIGURE 5 is a top plan view thereof;

FIGURE 6 is a front elevation thereof;

FIGURE 7a is a schematic illustration of the lawn to be edged, showing the grass and/or dirt overlying the adjacent sidewalk;

FIGURE 7b is a view corresponding substantially to that of FIGURE 7a, but illustrating the manner in which a relatively-narrow swath is cut in the lawn alongside of the adjacent sidewalk, and further illustrating the manner in which the overlying grass and/or dirt is scooped away from the adjacent sidewalk; and FIGURE 8 is a perspective of the lower portion of the improved blade of the present invention, showing the manner in which the scoops sever and scoop the overlying grass and/or dirt away from the adjacent sidewalk, the broken lines illustrating the manner in which the cut-back bottom edge of a respective scoop engages the overlying grass and/or dirt on the adjacent sidewalk to a substantially uniform degree.

With reference to FIGURE 1, there is illustrated a power-operated lawn-edging and trimming machine 10 with which the improved blade of the present invention may find particular utility. It will be appreciated by those skilled in the art, however, that the teachings of the present invention are equally applicable to a variety of lawn-edging machines, power-operated or otherwsie, and that the specific showing of the machine 10 is not intended to limit the scope of the claimed invention. With this in mind, the machine 10 generally comprises a motor housing 11, an integral skirt or guard 12, the housing and the guard preferably being formed with complementary mating portions or halves 11a and 11b, a wheel housing 13 provided with a pair of ground-engaging wheels, one of which is illustrated as at 14, a suitable means (not shown) for indexing or pivoting the motor housing 11 with respect to the wheel housing 13 for positioning the machine for trimming operations and a control handle 15 by means of which the unit may be manually guided and controlled.

With further reference to FIGURE 2, the motor housing has a suitable electric motor 16 provided with a shaft 17 journaled in a bearing 18 retained by means of a strap 19, and the improved blade 20 of the present invention is secured in a suitable manner to the driving shaft 17 of the motor.

With further reference to FIGURES 3–6, the blade 20 comprises an elongated relatively-thin substantially oblong (or rectangular) bar 21 which may be stamped and formed from a suitable sheet metal material and subsequently heat-treated. The leading edges of the bar 21 are formed with respective cutting edges 22 which are useful primarily when the machine is articulated for a trimming operation. The bar 21 is further provided with an central aperture 23 to facilitate connection to the driving shaft of the machine. A pair of upturned scoops 24 are provided; and preferably, but not necessarily, the scoops 24 are formed integrally with the respective trailing edges of the bar 21 as shown more particularly in FIGURE 4. The scoops 24 are preferably disposed at an obtuse dihedral angle (of approximately 120 degrees) with respect to the bar 21. When the bar is mounted in the position shown in FIGURE 2, it will be noted that the scoops 24 are positioned axially on the machine side of the bar. As shown more clearly in FIGURE 5, the scoops are spaced radially inwardly from the annular cutting swath of the cutting edges 22, the fly-circle cutting diameter of which denoted by FC, is established by the outermost end edge 25 of the bar 21. Moreover, see FIGURE 6, each of the scoops has a bottom edge 26 which is cut back starting from the body portion of the blade to the corner of the scoop for a purpose hereinafter explained.

With further reference to FIGURES 7a and 7b, the lawn to be edged is denoted generally as at 27, the adjacent sidewalk as at 28, and the grass and/or dirt (usually overlying the adjacent sidewalk) as at 29.

As illustrated in FIGURES 1 and 2, and as shown somewhat schematically in FIGURE 7b, the leading edges of the bar 20 cut a relatively-narrow swath 30 in the lawn 27 alongside of the adjacent sidewalk 28. Simultaneously, the scoops 24 of the blade 20 sever the overlying grass and/or dirt 29 from the adjacent sidewalk 28, scoop it away from the adjacent sidewalk, and accelerate it in a direction away from the lawn. Moreover, since the scoops 24 are formed at an obtuse dihedral angle with respect to the bar 21, the overlying grass and/or dirt will be accelerated in a direction having, not only a component laterally away from the lawn, but moreover, a component forwardly on the machine and away from the operator; and the result is to direct the severed and scooped away grass and/or dirt in a direction away from the lawn and away from the operator. This precludes the cuttings and scooped-away material from being accumulated along the line of cut, and hence does not interfere with the operator's convenient use of the machine. The cuttings are piled up in back of the machine, as at 31, in FIGURE 1.

With further reference to FIGURE 8, the cut-back bottom edge 26 of the blade 20 will engage the overlying grass and/or dirt from the adjacent sidewalk to a substantially uniform degree and will prevent the sidewalk from being scored by the scoops.

Obviously, many modifications may be made without departing from the basic spirit of the present invention; and accordingly, within the scope of the appended claim, the invention may be practiced other than has been specifically described.

I claim:

In a lawn edger of the type including a housing supported for movement over the ground, shaft means carried by said housing, and an edger blade supported upon said shaft; the improvement wherein said blade comprises a flat, generally rectangular bar having longitudinal side edges joined by respective ends and supported by said shaft for rotation about an axis which extends generally perpendicular to the plane of the bar and centrally thereof and generally parallel to the ground, whereby each of said longitudinal side edges has a leading edge and a trailing edge, a cutting edge formed on each of the leading edges of the bar, each said cuttting edge beginning at a respective end of the bar and extending radially inwardly thereof to define an annular cutting swath, a scoop on each of the trailing edges of said bar and positioned radially inwardly of said cutting swath, said scoops each extending rearwardly from respective trailing edges of said bar and defining an obtuse, dihedral angle with said bar.

References Cited

UNITED STATES PATENTS

| 2,737,105 | 3/1956 | Wilson | 112—15 |
| 2,917,826 | 12/1959 | Pohr | 56—295 |
| 3,221,481 | 12/1965 | Mattson et al. | 56—256 |
| 3,247,656 | 4/1966 | Phelps | 56—295 |

ABRAHAM G. STONE, *Primary Examiner.*

P. A. RAZZANO, *Assistant Examiner.*